United States Patent [19]
Damratowski et al.

[11] Patent Number: 5,592,793
[45] Date of Patent: Jan. 14, 1997

[54] ROUTER MACHINE

[75] Inventors: Harold E. Damratowski, Alda; Richard J. Merrick, Grand Island, both of Nebr.

[73] Assignee: Merrick Machine Co., Alda, Nebr.

[21] Appl. No.: 480,602

[22] Filed: Jun. 7, 1995

[51] Int. Cl.$^6$ .............................. E04F 11/00; B27C 5/00; B27B 1/00
[52] U.S. Cl. ........................... 52/182; 52/188; 52/741.2; 144/135.2; 144/136.6; 144/356; 144/382
[58] Field of Search ................................. 144/2.1, 136.1, 144/134.1, 135.2, 136.6, 3.1, 356, 382; 52/182, 183, 187, 188, 191, 741.2; 409/145, 156, 158, 162, 190, 205, 209, 213, 218

[56] References Cited

U.S. PATENT DOCUMENTS

| | | | |
|---|---|---|---|
| 1,154,752 | 9/1915 | Foster | 144/136.6 |
| 4,326,572 | 4/1982 | Ingram et al. | 144/136.6 |
| 4,673,011 | 6/1987 | Lapeyre et al. | 144/136.6 |
| 4,769,920 | 9/1988 | O'Connor, Jr. | 144/136.6 |

OTHER PUBLICATIONS

Automation in Housing & Manufactured Home Dealer, Feb. 1988, p. 58.
Ruvo Manufacturing, Model 2200 Series Automatic Double Stair Stringer Router, Apr./1989.

*Primary Examiner*—W. Donald Bray
*Attorney, Agent, or Firm*—Frost & Jacobs

[57] ABSTRACT

A router machine for making repetitive router cuts at predetermined positions on one or two workpieces. The router machine has a free standing main frame with an open work horizontal platform for supporting said one or two workpieces. The platform has a longitudinal front edge with a fence therealong. Clamping mechanisms for clamping the one or two workpieces at the predetermined positions. A workpiece feed mechanism for advancing the one or two workpieces to each of the predetermine positions. A pair of routers are provided having vertically oriented, opposed, coaxial bits. A movable support assembly supports the routers. The routers are shiftable vertically on the support assembly toward each other to an extended cutting position and away from each other to a retracted non-cutting position. A pair of linear actuator assemblies are provided, each having a first end pivotally attached to the main frame and a second end pivotally engaged with an upstanding pivot pin affixed to said router support assembly to shift said routers through the repetitive router cuts. The pivot pin is coaxial with the router bits. The router machine is provided with a programmable electronic control system having output signals controlling the workpiece clamping mechanisms, the workpiece feed mechanism, the routers and their vertical positions between their extended cutting positions and said retracted non-cutting positions and the linear actuator assemblies.

20 Claims, 11 Drawing Sheets

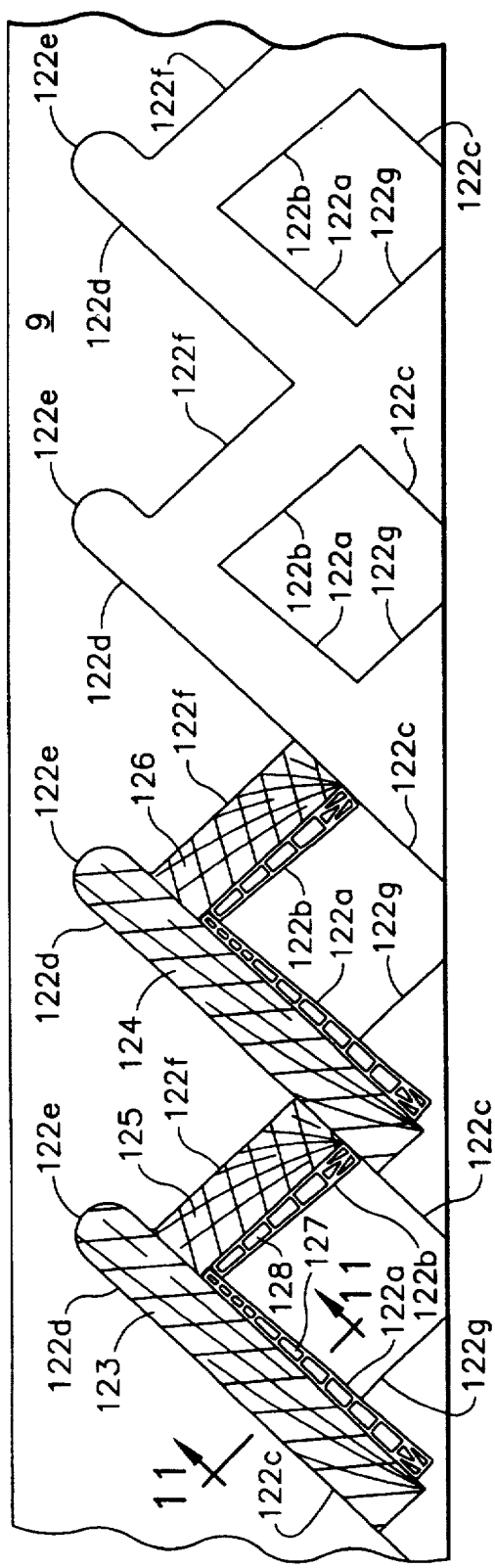
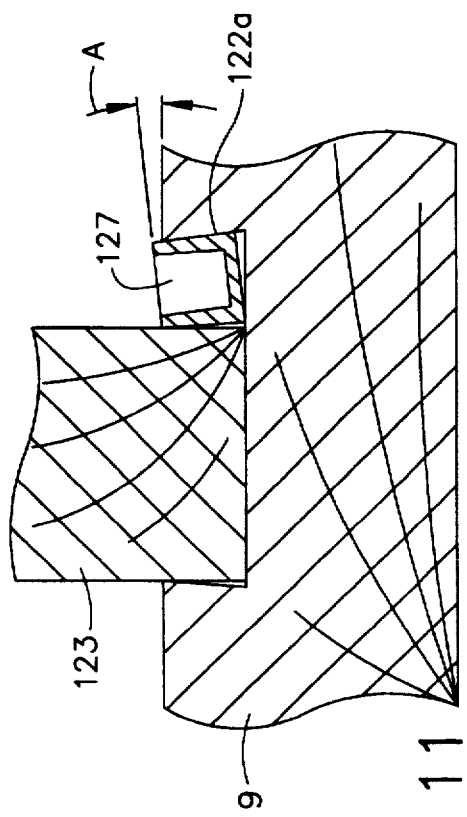
FIG. 10
FIG. 11

1
ROUTER MACHINE

TECHNICAL FIELD

The invention relates to a programmable computer-controlled router machine capable of making repetitive router cuts at predetermined positions along at least one workpiece, and more particularly to such a router machine having a router assembly maneuvered along predetermined paths of travel by a pair of linear actuators.

BACKGROUND ART

The router machine of the present invention may have many applications, and is particularly well adapted for making repetitive router cuts at predetermined positions in a workpiece. The router assembly of the router machine of the present invention may comprise one or two router devices. Where two router devices are provided, the blades of the router devices are opposed and coaxial. As a result, the router machine is capable of making simultaneous mirror image router cuts in both sides of a single workpiece, or in opposite sides of a stacked pair of workpieces. While not intended to be so limited, the router machine of the present invention is particularly well adapted to making simultaneous, mirror image router cuts in a stacked pair of stair stringers and, for purposes of an exemplary showing, will be described in this application of the machine. The router cuts made in the stair stringers are intended to accommodate treads and risers, if risers are present.

Router machines for making simultaneous, mirror image router cuts in stair stringers are, per se, known in the art. Such machines are normally provided with a router assembly having opposed router devices with coaxial, opposed router bits or blades. In the most frequently encountered prior art router machine of the type under discussion, the router assembly and its blades are guided by a rotatable stylus which runs inside an adjustable template. The stylus is positioned coaxially with the router blades or bits. The stylus is directed around the inside of the template by a pair of air cylinders. The air cylinders, in turn, are controlled by a series of valves mounted on the template. While such router machines operate well, they are very labor intensive to build, assemble and operate. The prior art router machines tend to be complex in structure, and considerable time and effort is required to modify the adjustable template when required, depending upon the type of stairway to be produced.

The router machine of the present invention is mechanically simple to build and operate. As will be set forth hereinafter, all pertinent information relating to the stairs is entered into the electronic control system by means of an operator interface. The electronic control system instructs two linear actuators to maneuver the router assembly along the desired paths of travel. When one router cut is made for one riser and/or tread, a material feed mechanism advances the stair stringers to the position for the next routing operation, the movement of the stringers being measured and monitored by an encoder wheel. When the prescribed number of router cuts has been made in the stringers, the router machine will automatically shut down.

Most prior art router machines of the type to which the present invention is directed use linear cross slides to support the router devices. The cross slides are difficult to keep clean and lubricated in a dirty environment. The router devices of the router machine of the present invention are supported on four sealed pillow block bearings. As a result, lubrication and dirt do not constitute a problem.

DISCLOSURE OF THE INVENTION

According to the invention there is provided a programmable computer numeric control (CNC) router machine for making repetitive router cuts at predetermined positions on a workpiece. The router machine comprises a free standing main frame having an openwork horizontal platform for supporting at least one workpiece. The main frame additionally supports a series of clamping elements by which the workpiece is immobilized at each of the positions thereof wherein a routing operation is performed thereon. A material feed mechanism, having a workpiece contacting position encoder, is mounted on the main frame adjacent the platform. The material feed mechanism shifts the workpiece along the platform from one routing position thereof to the next.

A router assembly is provided having at least one router device with a bit or cutter. The router device is mounted on a support arm and is shiftable vertically with respect to the support arm by an air cylinder between a retracted non-cutting position and an extended cutting position. The router assembly support arm is pivotally connected by sealed pillow blocks to an idler link. The idler link, in turn, is pivotally connected by sealed pillow blocks to the main frame.

A pair of linear actuators, provided with position encoders, is pivotally affixed to the main frame and to the router assembly. The linear actuators are controlled by the computer and maneuver the router assembly and its at least one bit or cutter along predetermined paths of travel during each router operation on the workpiece. It is within the scope of the invention to provide the router assembly with two router devices each having a cutter or bit. The bits of the router devices are coaxial with respect to each other and with respect to the pivotal attachment of the linear actuators to the router assembly. Both router devices are shiftable vertically with respect to the support arm by air cylinders between cutting positions and non-cutting positions. This arrangement enables simultaneous mirror image cuts to be made on both sides of a workpiece, or on opposite sides of two workpieces, one stacked on top of the other.

The router machine has an electronic control system which controls the material feed mechanism, the clamps, the router devices, the router device shifting air cylinders, and the linear actuators. The electronic control system comprises the above-noted computer, a programmable logic controller and an operator interface. The computer receives feedback from the material feed mechanical position encoder and the linear actuator position encoders.

BRIEF DESCRIPTION OF THE DRAWINGS

FIG. 10 is a fragmentary elevation view of a stringer with two pair of treads and raisers mounted therein with wedges.

FIG. 11 is a cross sectional view taken along section line 11—11 of FIG. 10.

DETAILED DESCRIPTION

Figure 1:
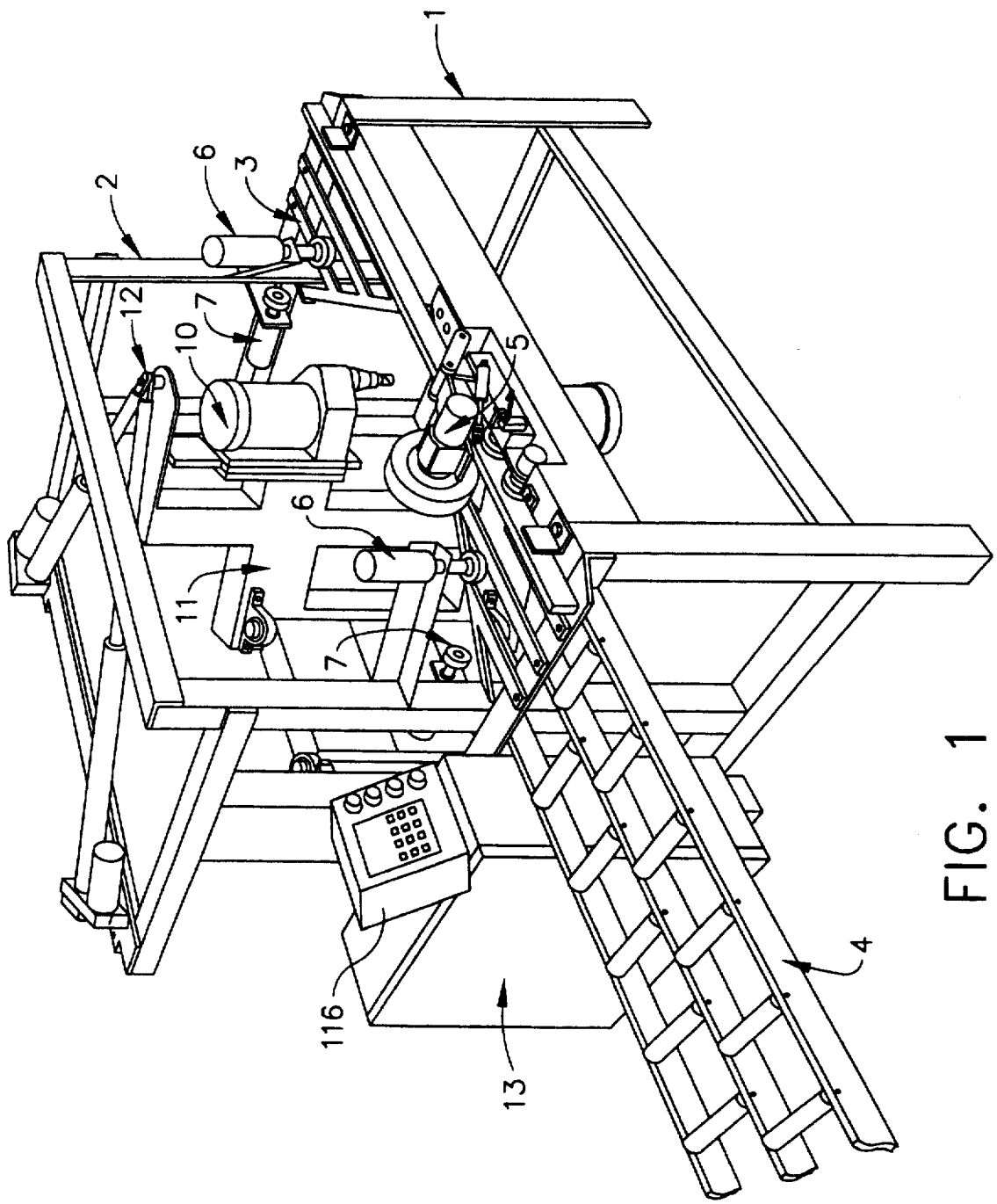
FIG. 1 is a fragmentary, simplified, perspective view of the stair routing machine of the present invention.

In all of the drawings, like parts have been given like index numerals. Reference is first make to FIG. 1 which illustrates the overall stair router machine of the present invention and all of its primary components, each of which will be described in detail hereinafter. The stair router machine is generally indicated at 1 and comprises a mainframe, generally indicated at 2. The mainframe 2 has a work supporting platform generally indicated at 3. The material to be routed is brought to the work platform 3 by a conveyor generally indicated at 4. The material is drawn onto the work platform 3 and is properly repositioned thereon by a material feed mechanism generally indicated at 5. Each time the workpieces are positioned or repositioned on the work platform 3 by the material feed mechanism 5, they are clamped by a pair of vertical clamps generally indicated at 6 and a pair of horizontal clamps generally indicated at 7.

As will be apparent hereinafter, the material to be routed comprises a pair of wooden stair stringers fragmentarily shown at 8 and 9 in FIGS. 2 and 3. Each individual routing operation is performed on both stringers 8 and 9 simultaneously by a routing assembly generally indicated in FIG. 1 at 10. The router assembly 10 is provided with a hinged support assembly, generally indicated at 11. The router assembly 10 is directed along its paths of travel by a router assembly shifting mechanism generally indicated at 12. The stair router machine 1 and its various appurtenances are controlled by an electronic control systems, generally indicated at 13.

Figure 2:
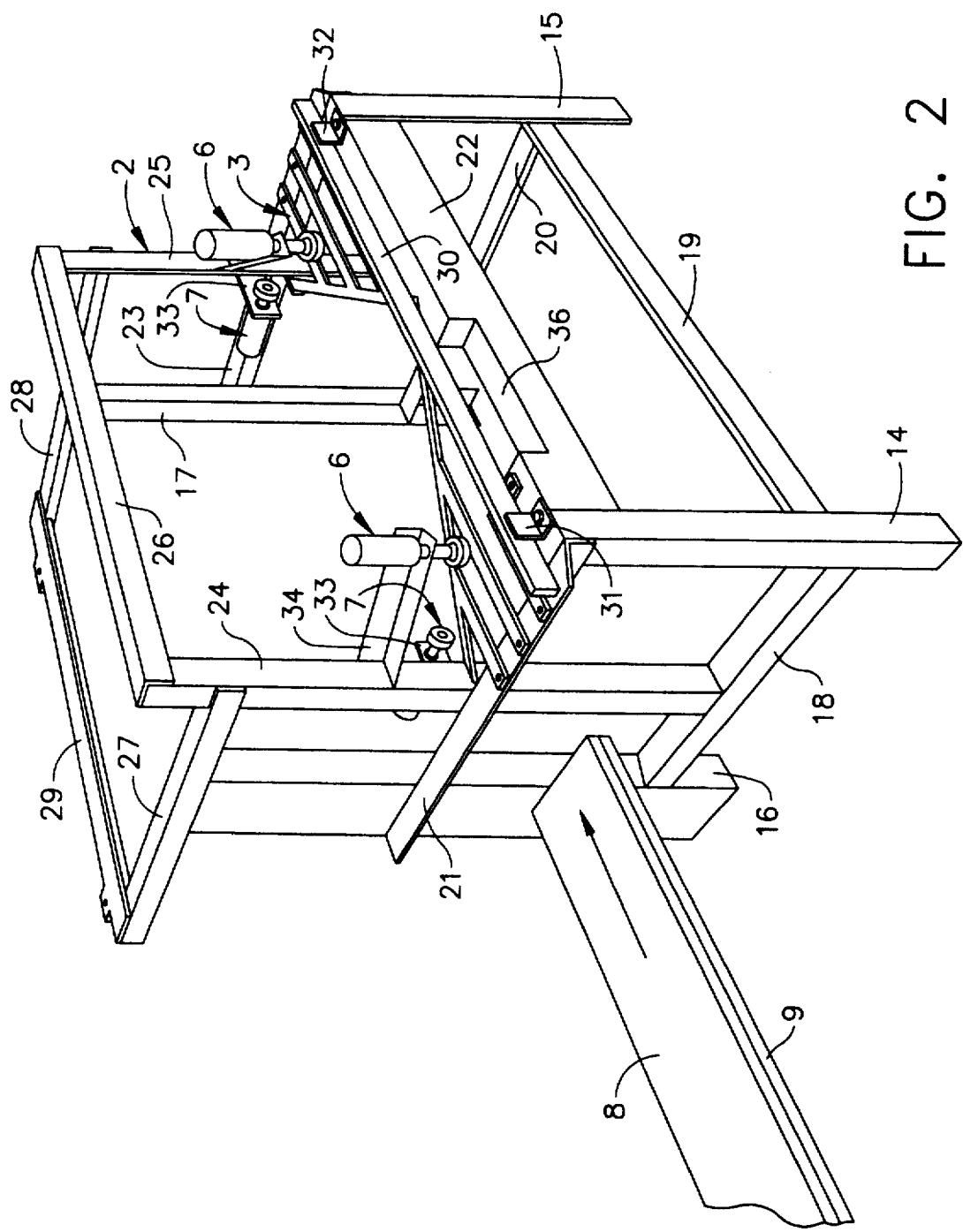
FIG. 2 is a fragmentary, simplified, perspective view, similar to FIG. 1 and illustrating only the main frame with its work supporting platform, fence, and vertical and horizontal workpiece clamps.

Turning to FIG. 2, the mainframe 2 comprises a pair of forward uprights 14 and 15 and a pair of rearward uprights 16 and 17. The uprights are joined by a series of lower horizontal members 18, 19 and 20 and a series of intermediate members 21, 22, and 23. A pair of uprights 24 and 25 extend upwardly from lower horizontal members 18 and 20, respectively, and are joined at their uppermost ends by a horizontal frame member 26. A rearwardly extended upper horizontal member 27 is supported on vertical members 16 and 24. In a similar fashion, a second rearwardly extending upper horizontal member 28 is supported on vertical members 17 and 25. The free rearward ends of upper horizontal members 27 and 28 are connected by a rear upper horizontal member 29.

The mainframe 2 supports the work platform 3. As is clearly shown in FIG. 6, the work platform 3 is an open-work platform comprising longitudinal members 3a–3f and a V-shaped element 3g, all lying in the same plane. All of the members of the work platform 3 constitute an integral, one-piece part of the platform except element 3c. The element 3c is not a part of the V-shaped element 3g and is supported at its inner end by a brace 4 attached to forward intermediate horizontal member 22. This is true to make room for the material feed mechanism 5, to be described hereinafter. The outer ends of elements 3a and 3b, as well as the outer end of 3c are attached to the intermediate horizontal member 21. The elements 3d, 3e and 3f are attached, at their outer ends, to intermediate horizontal member 23. It will be understood that the V-shaped portion 3g of work platform 3 provides clearance for the lower router of the router assembly 10, to be described hereinafter.

The effective forward edge of the work platform 3 is defined by a vertically oriented fence 30 extending the length of the work platform 3 and supported on the front intermediate horizontal member 22 by brackets 31 and 32.

When the workpieces or stringers 8 and 9 are conveyed on conveyor 4 to the work platform and are engaged, drawn onto the work platform 3 and positioned thereon by the material feed mechanism 5, the workpieces will be clamped against fence 30 by the pair of horizontal clamps 7. The horizontal clamps 7 may be of any appropriate type, and are illustrated in the Figures as being air actuated clamps. The horizontal clamps 7 prevent lateral shifting of the workpieces 8 and 9 on the work platform 3. Once the workpieces have been clamped by horizontal clamps 7, they are thereafter further clamped by vertical clamps 6. The vertical clamps 6 assure that the workpieces 8 and 9 are properly seated on the work platform 3 and act, with the horizontal clamps 7, to preclude longitudinal movement of the workpieces. For purposes of an exemplary showing, the vertical clamp 6 are also shown as air actuated clamps. Horizontal clamps 7 are mounted by appropriate bracket means to the upright frame members 24 and 25. The vertical clamps 6 are appropriately supported by brackets 34 and are also affixed to vertical upright frame members 24 and 25.

Figure 3:
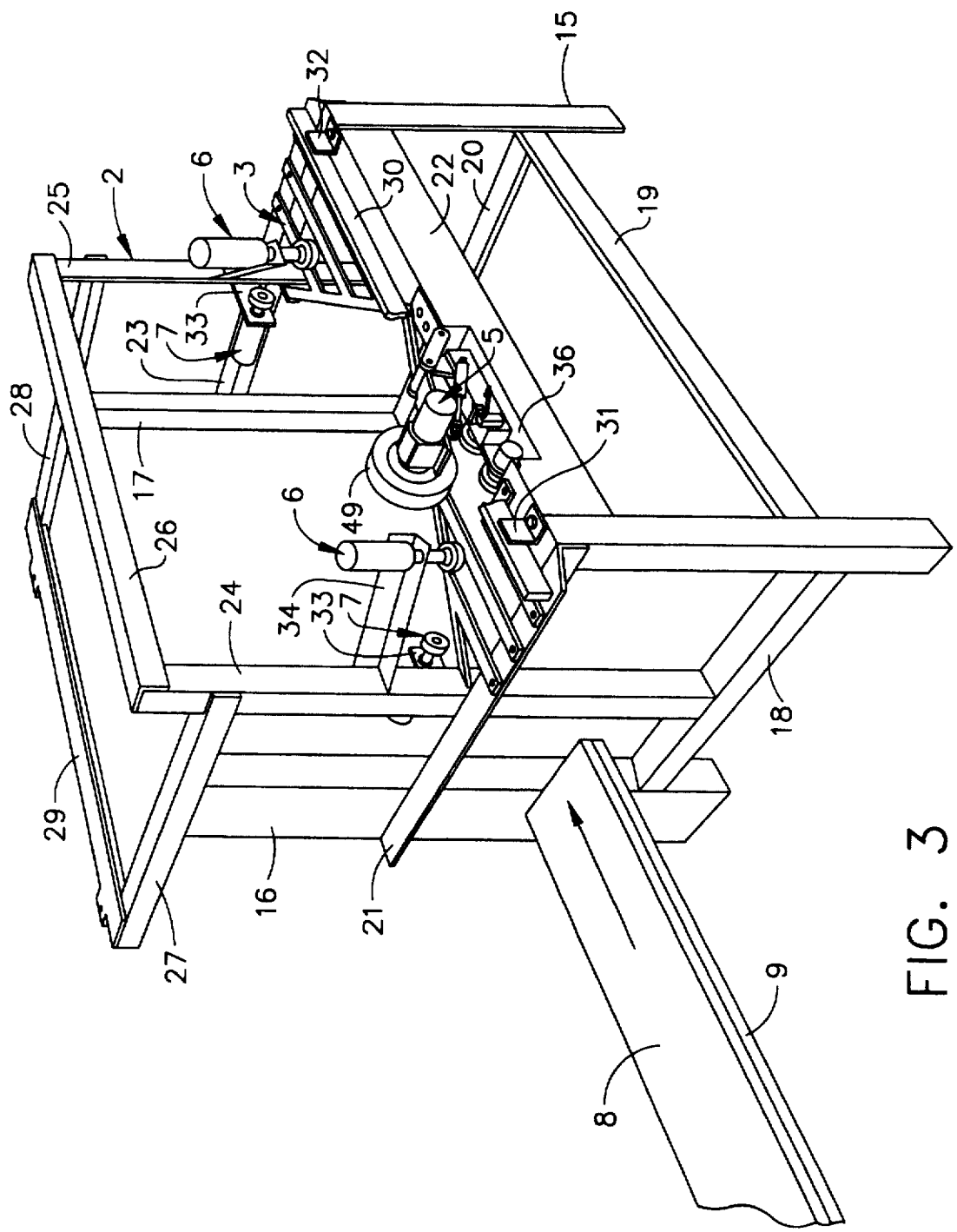
FIG. 3 is a perspective view similar to FIG. 2 including the material feed mechanism.
Figure 4:
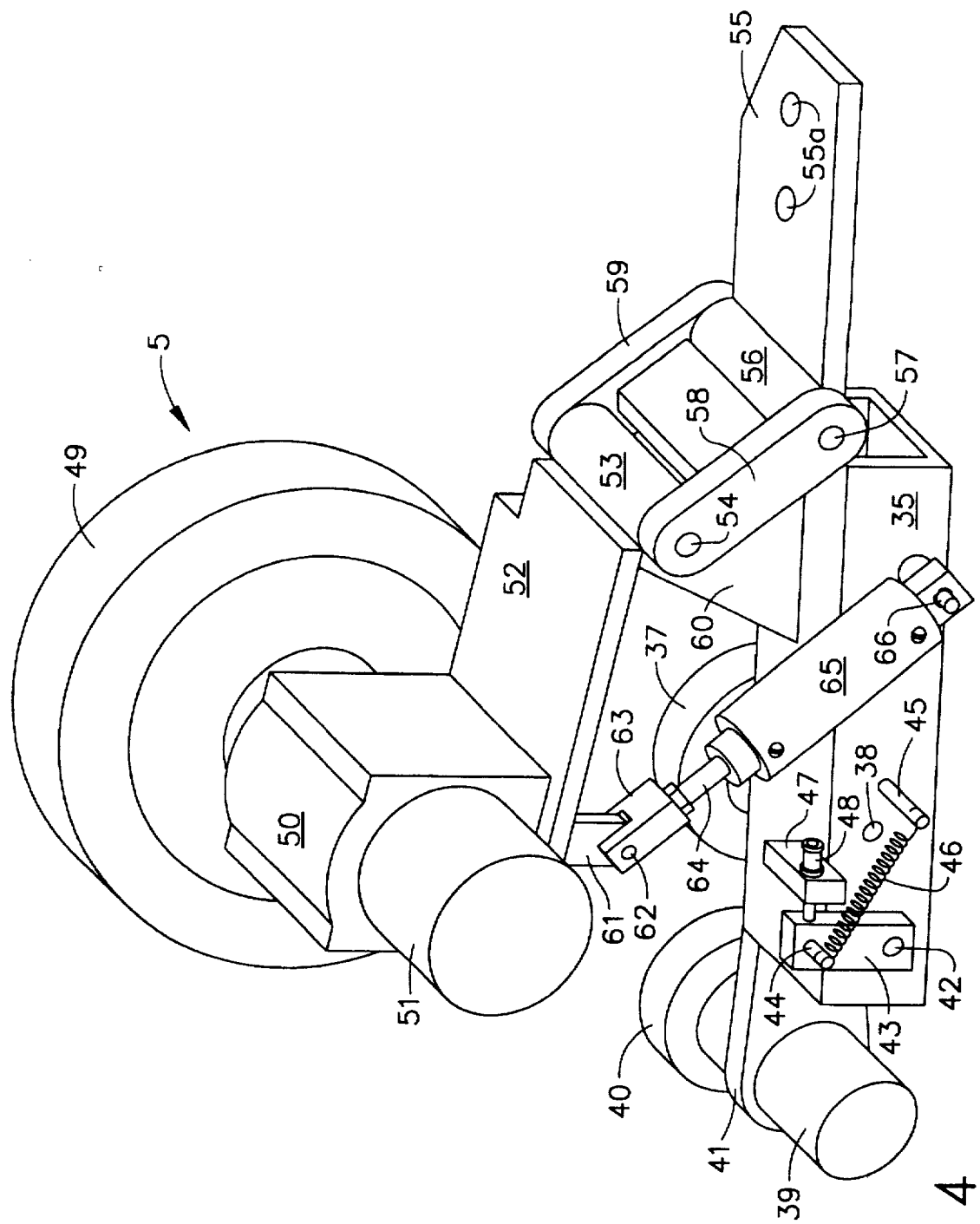
FIG. 4 is an enlarge perspective view of the material feed mechanism of FIG. 3.

Reference is now made to FIGS. 3 and 4, wherein the material feed mechanism 5 is most clearly shown. The material feed mechanism 5 comprises a body 35. The body 35 my take any appropriate form, and is illustrated as comprising an elongated tubular member of rectangular cross section mounted in a longitudinal notch 36 formed in the intermediate front horizontal member 22 of main frame 2. The body 35 supports an idler wheel 37 rotatively mounted on shaft 38 affixed to the body 35. The purpose of idler wheel 37 will be apparent hereinafter.

An encoder 39, having a rotatable encoder wheel 40, is mounted on a lever 41. The lever 41 is non-rotatively affixed to the inside end of a shaft 42. The shaft 42 is rotatively mounted in the body 35 of the material feed mechanism 5. The outer end of shaft 42 has a second lever 43 non-rotatively affixed thereto. The lever 43 is provided with a laterally extending peg 44. In a similar fashion, the material feed mechanism body 35 is provided with a laterally extending peg 45. The pegs 44 and 45 serve as anchors for a tension spring 46. A stop block 47 is welded or otherwise appropriately affixed to the material feed mechanism body 35 and supports an adjustment screw 48. The adjustment screw 48 is adapted to abut second lever 43, as shown in FIG. 4.

It will be evident from FIG. 4 that tension spring 46 constituently urges second lever 43 in a clockwise direction (as viewed in FIG. 4) about pivot pin 42. This, in turn, urges the first lever 41 and the encoder 39 and encoder wheel 40 in a clockwise direction about the same pivot pin 42. Thus, the encoder wheel 40 is constantly urged upwardly, with its uppermost position adjustably determined by abutment of adjustment screw 48 against second lever 43. This assures that the encoder wheel 40 is always in contact with bottom most workpiece or stringer 9 of a pair located on the work platform 3, so that the output signal of the encoder 39 will make the electronic control system 13 aware of the position of the stacked workpieces 8 and 9 at all times.

A workpiece drive wheel 49 is mounted on the output shaft of a gear reducer 50 associated with a stepping motor 51. The drive wheel 49 is aligned with idler wheel 37. The assembly of the drive wheel 49, gear box 50 and stepping motor 51 is mounted on a plate 52, the free end of which terminates in a tubular portion 53 rotatable about a shaft 54. An attachment plate 55 is provided with perforations 55a by which it may be bolted or otherwise fastened to the intermediate horizontal forward member 22 of mainframe 2. One end of mounting plate 55 terminates in a tubular portion 56 rotatively mounting a shaft 57. The shafts 54 and 57 are interconnected by a pair of links 58 and 59. The body 35 of the material feed mechanism 5 is provided with a block 60 providing a fulcrum for the tubular portion 53 of plate 52.

Depending from the underside of plate 52 there is a lug 61 which is pivotally attached by a pivot pin 62 to a bifurcated member 63 affixed to the piston rod 64 of an air cylinder 65. The air cylinder 65, in turn, is pivotally attached to a laterally extending pin 66 affixed to body 35. Air cylinder 65 serves to shift the drive wheel between a disengaged upper position shown in FIG. 4 and an engaged lower position wherein the drive wheel pinches the pair of workpieces between itself and idler when 37. When in its actuated position, the drive wheel will advance and position the pair of workpieces, the drive wheel being driven by stepping motor 51 and gear reducer 50.

Figure 5:
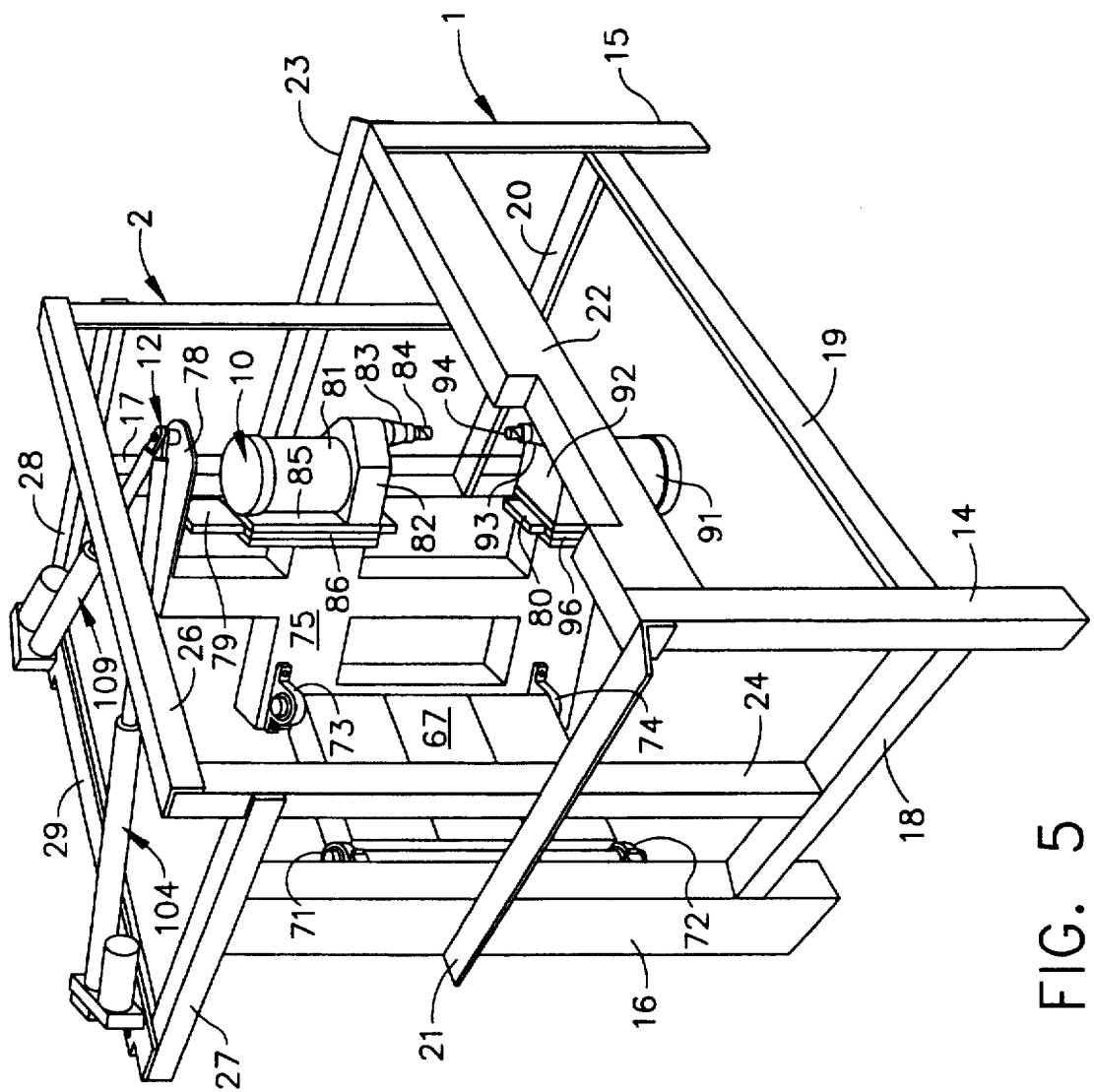
FIG. 5 is a simplified, perspective view of the mainframe with the idler link, the mounting arm for the router heads, the router heads, and the linear actuators mounted thereon.
Figure 6:
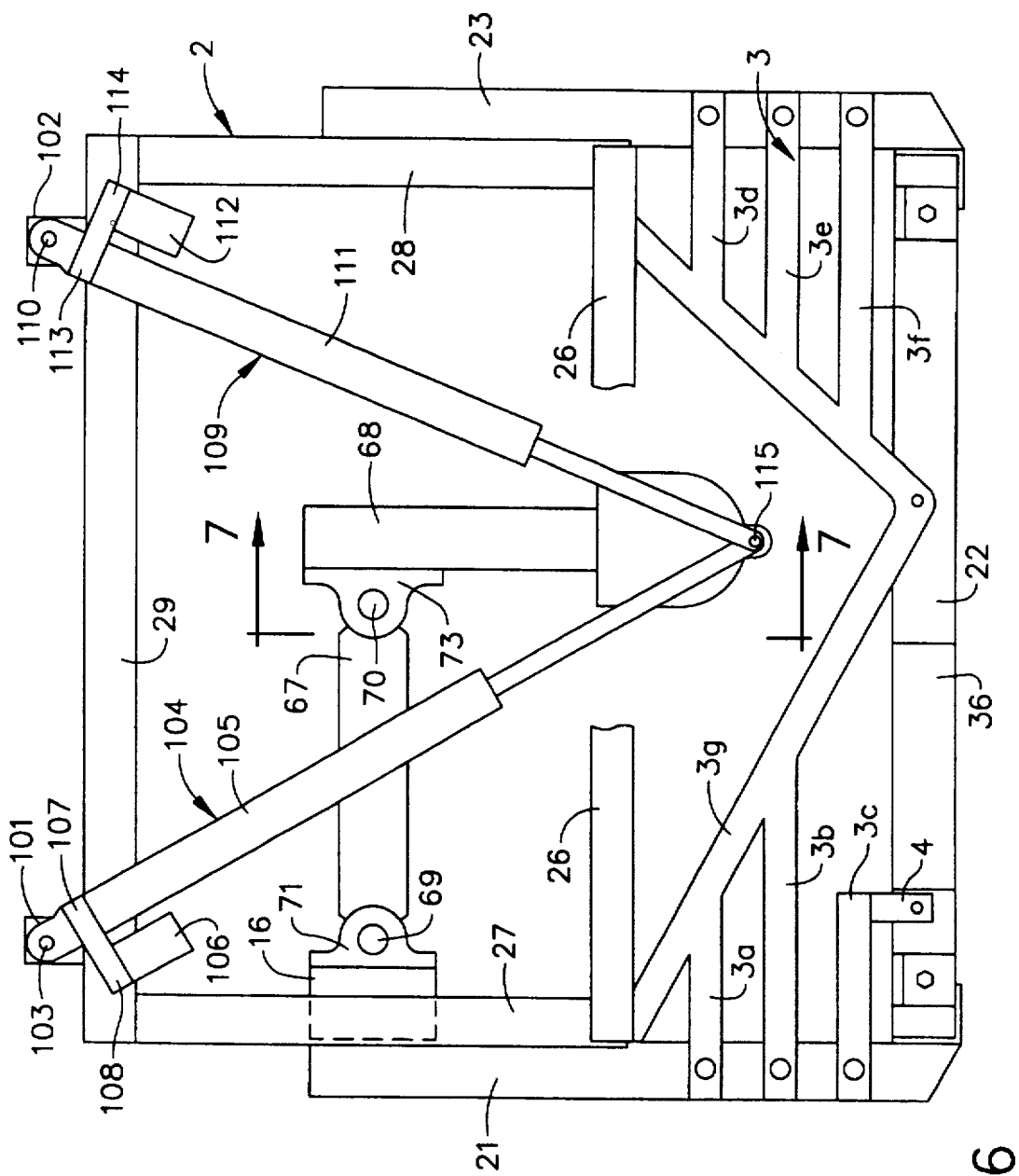
FIG. 6 is a simplified plan view of the structure of FIG. 5.
Figure 7:
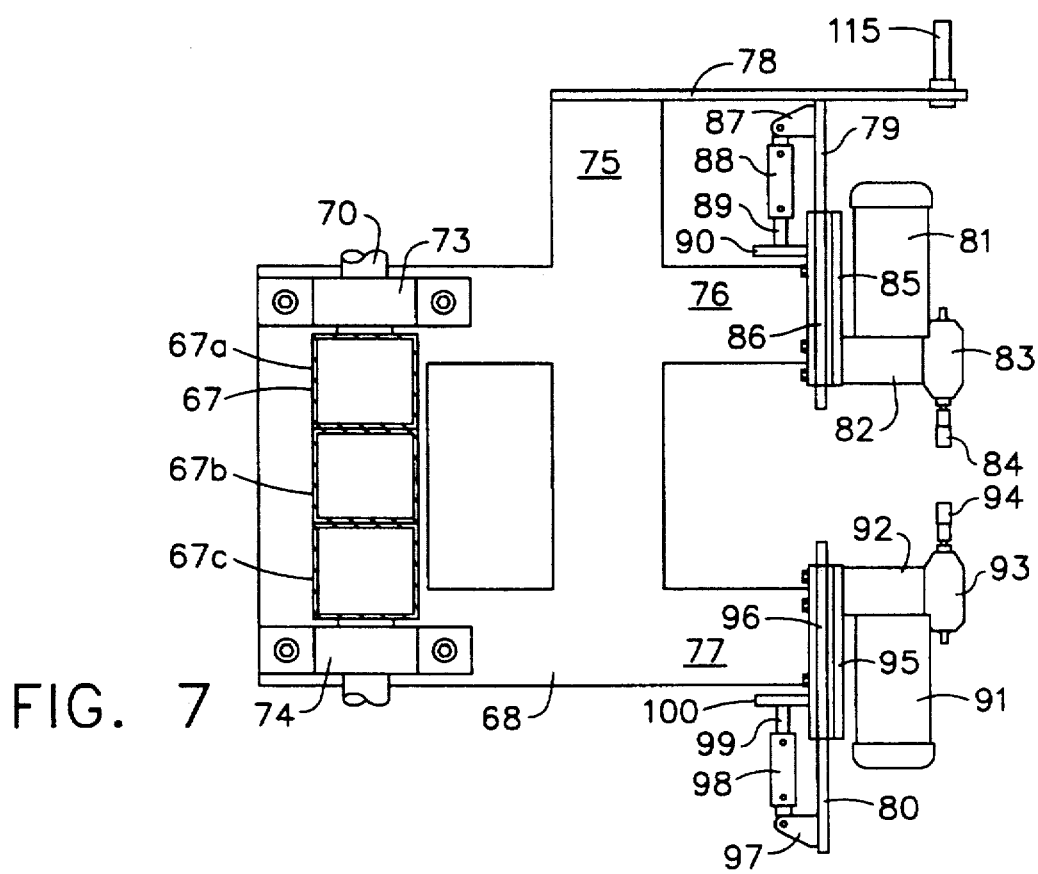
FIG. 7 is a cross sectional elevational view, taken along section line 7—7 of FIG. 6, and illustrating the router heads, the mounting arm for the router heads, and the idler link.
Figure 7A:
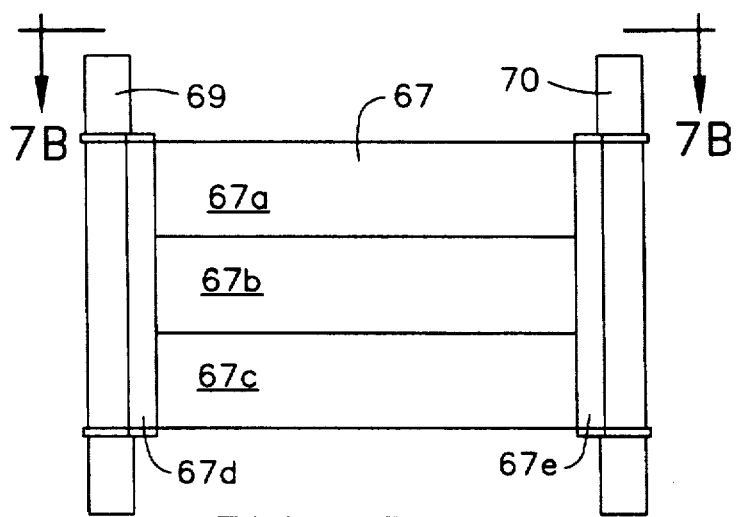
FIG. 7A is an elevational view of the idler link.
Figure 7B:
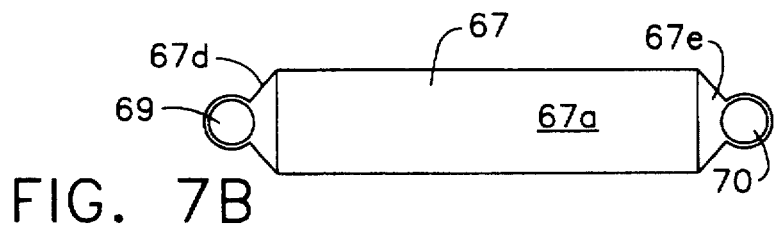
FIG. 7B is a plan view of the idler link as seen along the direction line 7B—7B of FIG. 7A.

At this point, the router assembly and its support will be described with reference to FIGS. 5, 6, 7, 7A and 7B. The router assembly support 11 is made up of two primary parts, an idler link 67 and a router mounting arm 68. As is most clearly shown in FIGS. 7 and 7A, the idler link 67 is a rectangular panel-like member made up of rectangular tubular members 67a, 67b and 67c (see FIG. 7). Idler link 67 has end pieces 67d and 67e in which shafts 69 and 70 are fixed, respectively. As is best shown in FIGS. 5 and 6 the idler link shaft 69 is rotatively mounted in a pair of pillow blocks 71 and 72 affixed to the upright member 16 of mainframe 2. As is shown in FIGS. 5, 6 and 7, the other shaft 70 of idler link 67 is rotatively mounted in pillow blocks 73 and 74 mounted on the router mounting arm 68. The idler link 67 could have other appropriate constructions so long as it is sufficiently strong to serve its purpose and resists bending or distortion.

The router mounting arm comprises an open frame-like member having an upper extension 75 and a pair of forward extensions 76 and 77. The upper extension 75 has a forwardly extending plate 78 welded or otherwise appropriately affixed to its uppermost end. The purpose of plate 78 will be apparent hereinafter.

The forward extensions 76 and 77 of router mounting arm 68 have vertically oriented plates 79 and 80 welded or otherwise appropriately affixed thereto, respectively.

The upper router device of the router assembly 10 comprises a motor 81 mounted on a gear box 82. A router head 83 is also affixed to gear box 82 and carries a router blade 84. The gear box 82 is affixed to a vertical plate 85 which has a pair of ways bolted adjacent its vertical edges. One such way is illustrated in FIGS. 5 and 7 at 86. The other way mounted on plate 85 will be a mirror image of way 86. The ways slidably engage the vertical edges of the plate 79 affixed to router mounting arm 76. The router mounting arm plate 79 carries a bracket 87 supporting an air cylinder 88. The air cylinder has a piston rod 89 affixed to a bracket 90. The bracket 90, in turn, is affixed to the pair of ways (one of which is shown at 86) mounted on plate 85. By means of cylinder 88, the upper router device including the motor 81, gear box 82, router head 83, router blade 84 and plate 85 may be shifted vertically between a retracted non-cutting upper position and an extended lower cutting position.

The lower router device is identical to the upper router device with the exception that it is upside down with respect to the upper router device, which is clearly evident from FIG. 7. The lower router device comprises a motor 91, a gear box 92, a router head 93 and a router blade 94, identical to the corresponding elements 81, 82, 83 and 84 of the upper router device. The gear box 92 of the lower router device is affixed to a vertical plate 95 equivalent to upper router device plate 85. The plate 95 is provided at its edges with ways (one of which is shown as 96) in the same manner described with respect to the upper router device. The way 96 and its counterpart along the other vertical edge of plate 95 engage the vertical edges of plate 80 and are shiftable vertically therealong. The plate 80 carries a bracket 97 equivalent to bracket 87 and supporting an air cylinder 98 equivalent to air cylinder 88. The piston rod 99 of air cylinder 98 is attached to a bracket 100, equivalent to bracket 90, and affixed to the ways of plate 95. By means of cylinder 98, the lower router device is shiftable vertically between and extended upper cutting position and a retracted lower non-cutting position.

The router assembly shifting mechanism 12 will now be described. Reference is made to FIGS. 5 and 6. The upper rear horizontal member 29 of main frame 2 has a pair of brackets 101 and 102 affixed thereto. Pivotly attached at 103 to bracket 101 is a linear actuator assembly generally indicated at 104. The linear actuator assembly 104 comprises a linear actuator 105, a motor 106, a gear box 107 and an optical encoder 108. In a similar fashion, a second linear actuator assembly, generally indicated at 109, is pivotally attached at 110 to bracket 102. As is true of linear actuator assembly 104, the linear actuator assembly 109 comprises a linear actuator 111, a motor 112, a gear box 113 and an optical encoder 114.

The linear actuators 105 and 111, at their forwardmost ends, are pivotally attached to an upstanding pivot pin 115 mounted on the upper horizontal plate 78 of router mounting arm 68 (see also FIG. 7). The linear actuators 105 and 111, under the guidance of the electronic control 13 drive the pivot pin 115 along the desired paths of travel of the router blades 84 and 94. This also drives the router blades 84 and 94 along the desired paths of travel, since the router blades 84 and 94 are coaxial with the pivot pin 115, as is apparent from FIG. 7.

Referring again to FIG. 1, the electronic control system 13 comprises a computer numeric controller and a programmable logic controller. The computer numeric controller has output signals controlling the horizontal clamps 7, the vertical clamps 6, the material feed mechanism 5, the motors 81 and 91 of router assembly 10, the router device positioning cylinders 88 and 98, and the motors 100 and 112 of the linear actuators 105 and 111, respectively. The computer numeric control receives feedback from the material feed mechanism encoder 39 indicating, at any given time, the position of a pair of workpieces. In similar fashion, feedback is also provided to the computer numeric controller by the encoders 108 and 114, so that the position of the router blades 84 and 94 are known at any given time.

The electronic control system 13 also includes an operator interface 116 including a display, a keypad and/or push buttons. The operator interface 116 enables entry into the electronic control system 13 of all pertinent information relating to the stairs to be made. Such information includes, for example, the size of the wooden workpieces constituting the stair stringers, the number of steps to be provided, and the nature of the router cuts to be made, depending upon the nature of the steps, themselves. For example, where the stairway is to have treads only, the router blades may make plunge dado cuts. Where the stairway is provided with both treads and raisers, the router blades will make tread and riser cuts starting and ending the cuts at the rearward edges of the stringers. For a stairway having treads only, and incorporating wedges, the router blades will make a tread cut entering and exiting the wood workpieces from the rear edges thereof. Finally, if the stairway is to incorporate both treads and risers together with wedges, the router blades will make tread and riser cuts entering and exiting from the rearward edges of the stringers, the cuts having a slight undercut taper as will be described hereinafter.

The stair router machine of the present invention having been described in detail, its basic operation can now be set forth.

The electronic control system having been properly programmed for the type of stairs to be made, a pair of stringers 8 and 9, in stacked condition, is conveyed to the work platform 3 by conveyor 4. The conveyor 4 may be motorized, or the stringers 8 and 9 may be moved therealong manually. Once the stringers enter between the material feed mechanism drive wheel 49 and idler wheel 37, the material feed mechanism air cylinder 65 will draw the drive wheel downwardly against the workpieces 8 and 9 and the drive wheel will advance stringers 8 and 9 along work platform 3 in sequential stepped fashion, positioning the stringers 8 and 9 for each individual router operation thereon. The drive wheel stepping motor 51 is appropriately actuated by the electrical control system 13 before and after each individual router operation. The position of the stringers 8 and 9 on the work platform 3 is fed to the electronic control system 13 by encoder 39 and its wheel 40, urged into engagement with the lower stringer 9 by tension spring 46.

When the stringers 8 and 9 are properly positioned by the material feed mechanism 5 for a routing operation, the stringers 8 and 9 will first be shoved against fence 30 by horizontal clamps 7 and then will be additionally clamped to the work platform 3 by vertical clamps 6.

Figure 8:
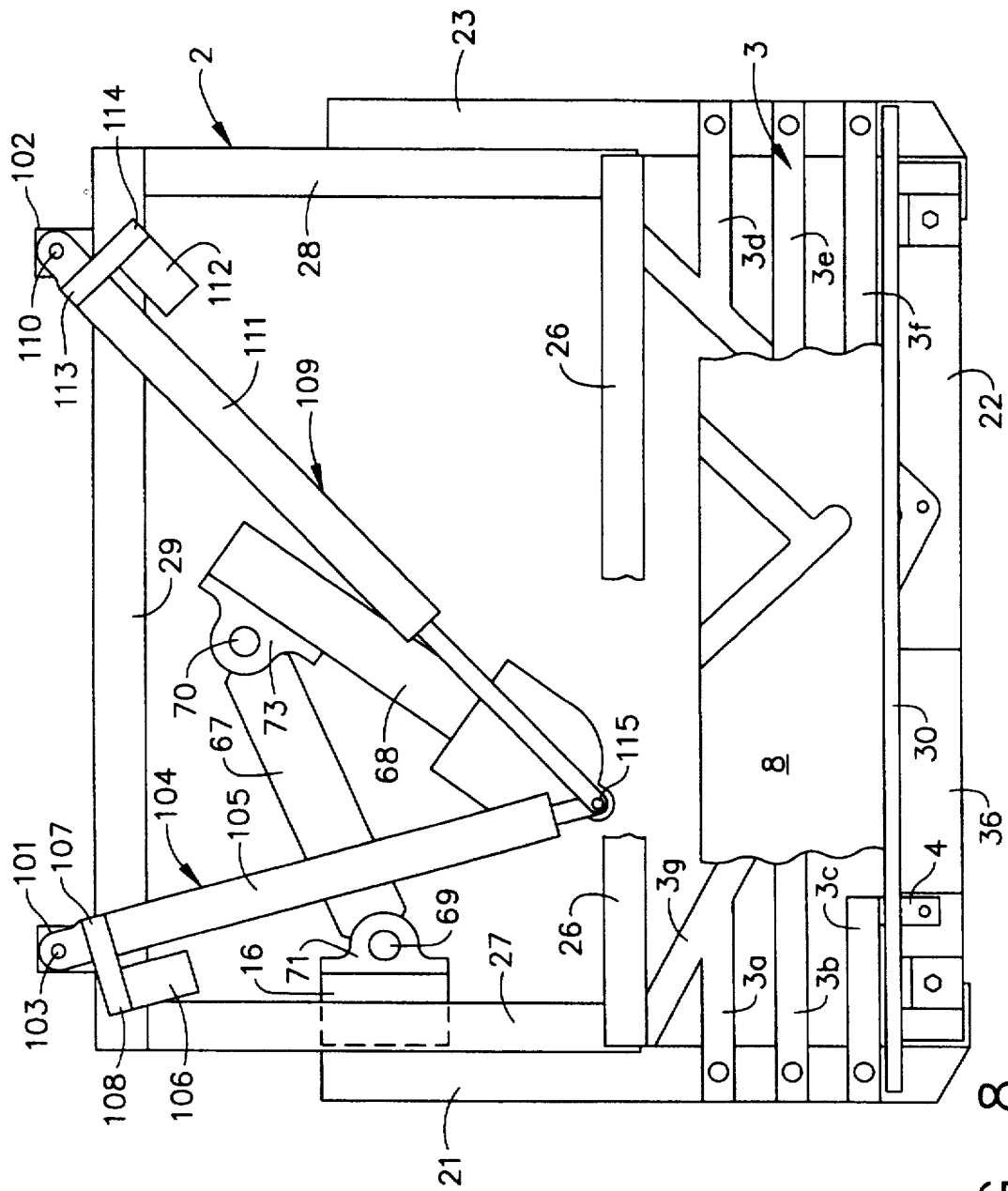
FIG. 8 is a simplified plan view, similar to FIG. 6, and illustrating the router head assembly in its withdrawn position prior to an individual routing operation.

During the positioning of the stringers 8 and 9, the router assembly 10 occupies a withdrawn position determined by the linear actuators 105 and 109, and shown in FIG. 8.

Figure 9:
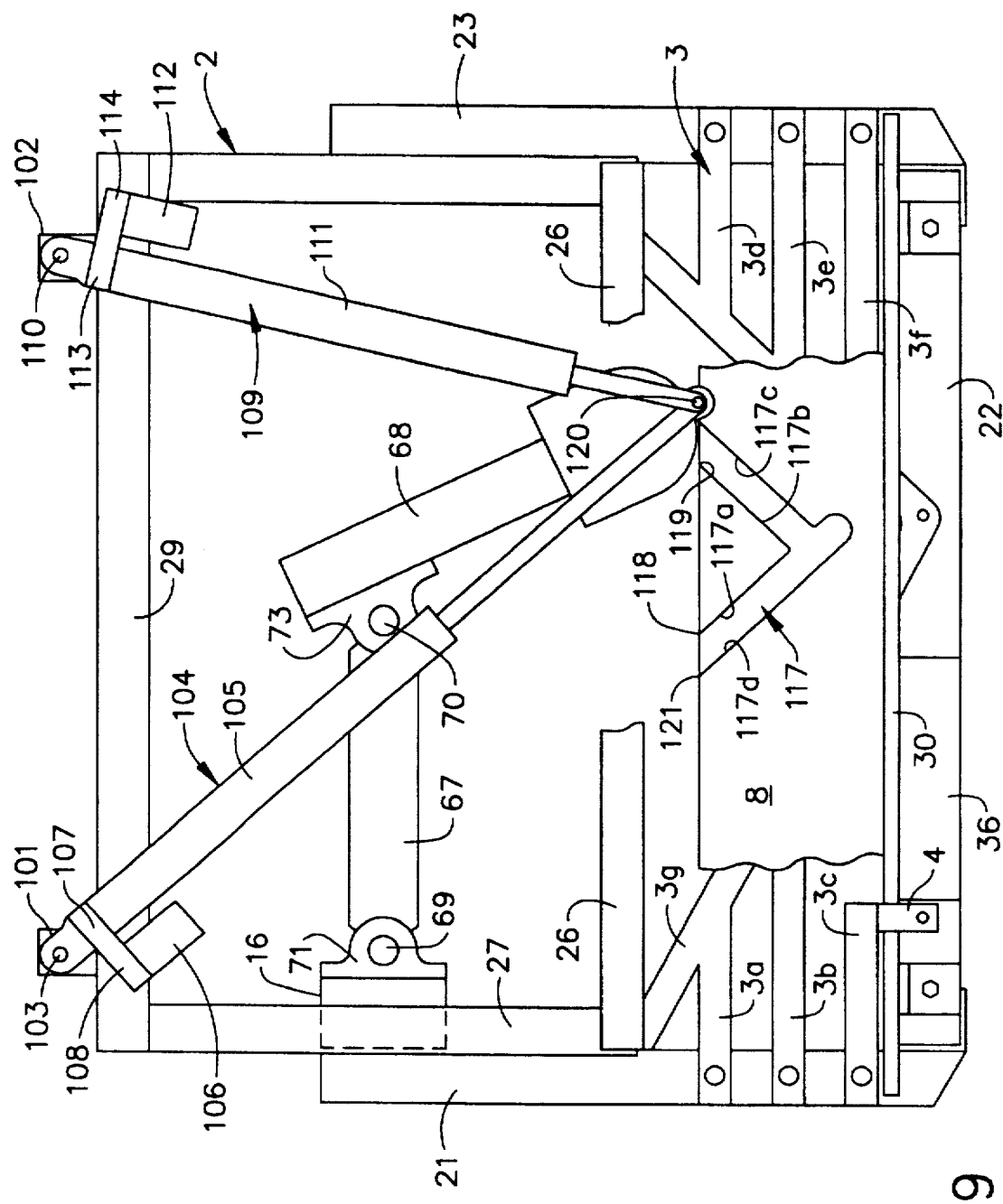
FIG. 9 is a simplified plan view, similar to FIG. 8, illustrating the router head assembly in its position at the end of an individual routing operation.

Reference is made to FIG. 9. Once the pair of stringers 8 and 9 have been properly positioned and clamped on work platform 3, the electronic control system 13 will instruct the two linear actuator assemblies 104 and 109 to maneuver the router assembly 10 along the prescribed paths to make the desired cuts. In FIG. 9, a typical tread and riser cut is generally indicated at 117. According to an exemplary program, the linear actuator assemblies 104 and 109 may maneuver the router assembly 10 to perform a first V-shaped cut defining the tread inner edge 117*a* and the riser inner edge 117*b*. To accomplish this, the router blades 84 and 94 enter the rear edges of stringers 8 and 9, respectively, as at point 118 and exit the rear edges of stringers 8 and 9 at point 119. Thereafter, the linear actuator assemblies 105 and 109 maneuver the router assembly 10 to make a second overlapping cut to form riser outer edge 117*c* and tread outer edge 117*d*. To accomplish this, the router blades 84 and 94 enter the rearward edge of stringers 8 and 9 at the position indicated at 120 in FIG. 9, and exit the rearward edges of the stringers 8 and 9 at the position indicated at 121 at FIG. 9. When the cut 117 is completed, the linear actuator assemblies 104 and 109 maneuver the router assembly to its withdrawn position shown in FIG. 8. At this point, the vertical claps 6 and horizontal clamps 7 are returned to their unactuated positions and the material feed mechanism, controlled by the electronic control system 13, shifts the stringers 8 and 9 to the next position wherein the router assembly is to form the next pair of tread and riser cuts, similar to that shown at 117 in FIG. 9. Once again, the stringers 8 and 9 are first engaged by horizontal clamps 7 and thereafter clamped by vertical clamps 6 and the routing operation is repeated. The movement of the stringers 8 and 9 along work platform 3 by material feed mechanism 5 is measured and monitored by the encoder wheel 40 and the encoder 39 (see FIG. 4). When the prescribed number of steps have been cut, the machine will automatically shut down. Since router blades 84 and 94 simultaneously cut both stringers 8 and 9, the completed stringers 8 and 9 will have mirror image tread and riser cuts or grooves 117 formed therein.

Where the stairs are to comprise treads only, the router assembly 10 need make only those cuts defining edges 117*a* and 117*d*. Alternatively, this may be accomplished by a plunge dado cut so that the edges 117*a* and 117*d* do not extend through the rear edge of the stringers 8 and 9. When the tread or treads and risers are located in their respective grooves, they may be affixed therein by nails or other fasteners, by glue, or both.

Figure 12:
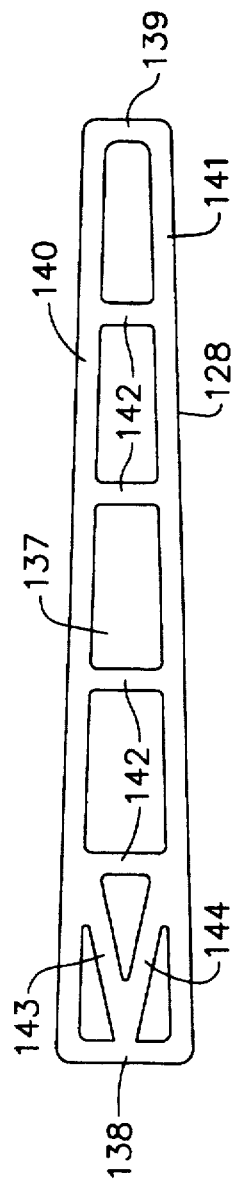
FIG. 12 is a plan view of a wedge for a riser.

FIGS. 10, 11 and 12 illustrate the use of wedges in the installation of treads and risers in a stringer. At each tread/riser position, the router blades are maneuvered to make overlapping inside and outside cuts. At each tread/riser position, the inside cut forms rectilinear edge portions 122*a* and 122*b*. Each outside cut forms aligned rectilinear edge portions 122*c* and 122*d*, curved edge portion 122*e*, and aligned rectilinear edge portions 122*f* and 122*g*. FIG. 10 illustrates two treads 123 and 124 and two risers 125 and 126, all of which are substantially conventional. It will be noted that at the position of the topmost tread 123, the rectilinear edges 122*c* and 122*d* are joined and form a continuous rectilinear edge.

It will be noted from FIG. 10 that the space between the rectilinear edge 122*c*/122*d* and the rectilinear edge 122*a* is wider than the thickness of tread 123. Similarly, the distance between the rectilinear edge 122*f* and the rectilinear edge 122*b* is wider than the thickness of riser 125. To compensate for these disparities in thickness, the tread 123 is forced against the rectilinear edge 122*c*/122*d* by tread wedge 127. Similarly, the riser 125 is forced against rectilinear edge 122*f* by riser wedge 128.

Figure 13:
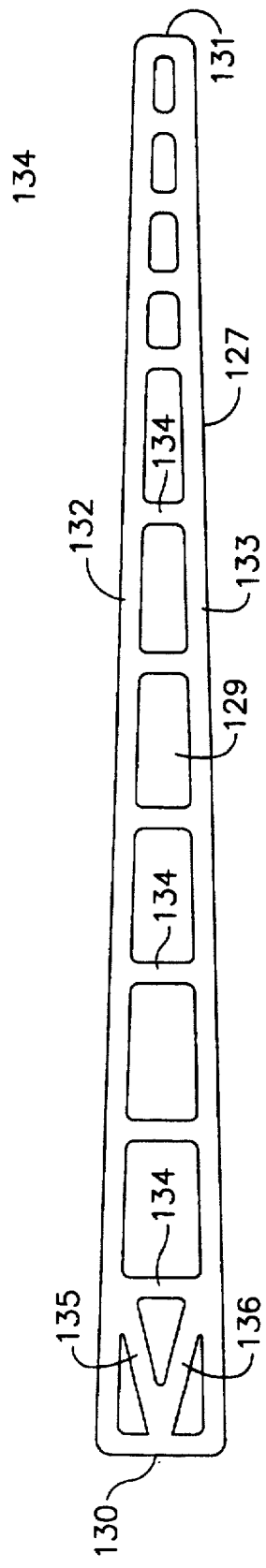
FIG. 13 is a plan view of a wedge for a tread.

The tread wedge 127 is shown in plan in FIG. 13 and the riser wedge 128 is shown in plan in FIG. 12. The wedges 127 and 128 are similar in construction. The wedges can be made of any appropriate material, as for example wood. As illustrated, both are molded of an appropriate plastic material. It will be noted that the tread wedge 127 is longer than the riser wedge 128. As will be evident from FIG. 10, this is true because the tread 123 has a greater transverse dimension than does the riser 125.

Figure 14:
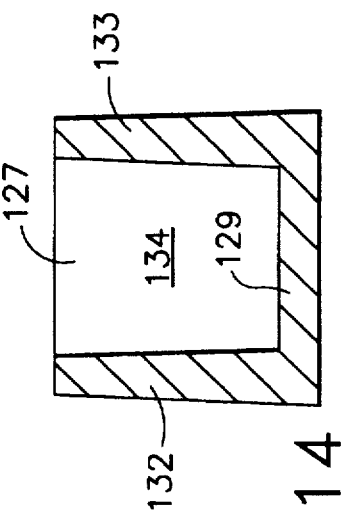
FIG. 14 is a cross sectional view of a wedge of the present invention.

Referring to FIGS. 13 and 14, the tread wedge 127 comprises a bottom 129, an upstanding rear end wall 130, an upstanding forward end wall 131 and upstanding sidewalls 132 and 133. The end walls 130 and 131 and the sidewalls 132 and 133 are of the same height. The forward end wall 131 is of lesser width than the rearward end wall 130, so that the walls 132 and 133 converge or taper inwardly from the rear end wall 130 to the front end wall 131, as is clearly shown in FIG. 13. The sidewalls 132 and 133 are additionally strengthened by a plurality of transverse webs 134. Between the rear wall 130 and the rearwardmost transverse web 134 there are additional strengthening webs 135 and 136 so that the rearward end of the wedge can withstand blows from a hammer or other appropriate tool.

In FIG. 14, the tread wedge 127 is shown in cross section with its base or bottom 129 horizontal and its walls 132 and 133 extending upwardly. As viewed in FIG. 14, it will be apparent that the outside surfaces of walls 132 and 133 taper upwardly and inwardly with respect to the vertical and inside surfaces of wedge walls 132 and 133 taper upwardly and outwardly with respect to the vertical. These inside and outside tapers are angled with respect to the vertical at about 2 degrees.

As indicated above, the riser wedge 128 is similar to but shorter than the tread wedge 127. The riser wedge 128 comprises a base or bottom 137, a rearward end wall 138, a forward end wall 139 and sidewalls 140 and 141. Rearward end wall 138 is wider than the forward end wall 139 with the result that the side walls converge or taper inwardly from rearward end wall 138 toward forward end wall 139. The sidewalls are reinforced by transversely extending webs 142, similar to the transverse webs 134 of tread wedge 127. Between the rear wall 138 and the rearmost transverse web 142 there are a pair of additional webs 143 and 144 similar to the webs 135 and 136 of tread wedge 127, and serving the same purpose. The longitudinal walls 140 and 141 of the riser wedge 128 have both inside and outside 2 degree tapers identical to those described with respect to FIG. 14.

Reference is now made to FIG. 11, which constitutes a cross sectional view taken along section 11—11 of FIG. 10. First of all, it is to be noted that the rectilinear edges 122c/122d and 122a are slightly undercut, i.e. the router blades 84 and 94 for this type of installation are so configured that these edges taper upwardly and inwardly, forming an angle with the vertical (as viewed in FIG. 11) of about 4 degrees.

In the usual practice, during the assembly of the stairway, the stringers 8 and 9 are held in parallel spaced relationship by an appropriate supporting device (not shown) with their routed surfaces facing each other and their rearward edges facing upwardly. The tread 123 is slipped within its respective groove in stringer 9 defined by edges 122c, 122d, 122e and 122a. It will be apparent that the other end of tread 123 will be similarly situated in its respective groove in stringer 8 (not shown). Thereafter, riser 125 will be caused to enter its groove in stringer 9 defined by edge 122f and edge 122b, with its end adjacent tread 123 abutting tread 123. At this stage, the tread wedge 127 is driven into place between the lower surface of tread 123 and the adjacent edge 122a, with the forward end of wedge 127 abutting riser 125.

FIG. 11 is a cross sectional view taken along section line 11—11 of FIG. 10 and illustrating stringer 9, tread 123 and tread wedge 127. It will be noted that when driven home, the tread wedge 127 is slightly tilted to so that the upper surface of tread wedge 127, as viewed in FIG. 11, forms an angle A of about 2 degrees with the adjacent surface of stringer 9. In the drawing, angle A has been exaggerated for purposes of clarity. This tilting of tread wedge 127 is caused in part by the 4 degree undercut of riser edge 122a. The similar 4 degree undercut of riser edge 122c/122d provides a sharp corner which bites into the adjacent surface of the tread for extra holding. The tread wedge 127 may be affixed in place by a fastener device such a staple, or by gluing, or both. In a similar fashion, the tread 123 may also be additionally nailed or glued or both to stringer 9. Thereafter, the riser wedge 28 may be driven into position, wherein its forward end 139 abuts the tread wedge 127, as shown in FIG. 10. It will be understood that the riser wedge will serve the same purpose for the riser as does the tread wedge 127 for the tread. The 4 degree undercut of the stringer edge 122b will cause the riser wedge to tilt in the same manner described with respect to tread wedge 27 in FIG. 11. The riser wedge may be fastened in position by stapling, gluing or both. The 4 degree undercut of the stringer edge 122f will provide a sharp corner which will bite into the adjacent surface of the riser 125. The riser 125 may also be additionally fastened by nailing, gluing or both, as set forth with respect to tread 123. It will be understood that edges equivalent to tread wedge 127 and riser wedge 128 will be used at the other ends of tread 123 and riser 125, in association with stringer 8, in an identical manner. Thereafter, tread 124 and riser 126 are similarly installed in stringers 8 and 9, and the process continues until all of the treads and risers are so installed. The resulting stairway is characterized by remarkable strength, stability and rigidity.

Modifications may be made in the invention without departing from the spirit of it. For example, as indicated above, the router machine of the present invention could be provided with a single router assembly to make cuts in just one surface of a workpiece. The same purpose could be accomplished by simply retaining one of the two routers in its retracted position.

What is claimed:

1. A router machine for making repetitive router cuts at predetermined positions on at least one workpiece, said router machine comprising a free standing main frame having an open work horizontal platform for supporting said at least one workpiece, said horizontal platform having a longitudinal front edge, clamping mechanisms for clamping said at least one workpiece at said predetermined positions, a workpiece feed mechanism for advancing said at least one workpiece to each of said predetermine positions, a router assembly having at least one router with a vertically oriented bit, a movable support assembly for said router assembly, said at least one router being shiftable vertically on said support assembly between an extended cutting position and a retracted non-cutting position, a pair of linear actuator assemblies each having a first end pivotally attached to said frame and a second end pivotally engaged with an upstanding pivot pin affixed to said router support assembly to shift said at least one router through said repetitive router cuts, said pivot pin being coaxial with said bit of said at least one router, a programmable electronic control system having output signals controlling said workpiece clamp mechanisms, said workpiece feed mechanism, said at least one router, said vertical router position between said extended cutting position and said retracted non-cutting position, and said linear actuator assemblies.

2. The router machine claimed in claim 1 including a vertically oriented fence affixed to said main frame and extending substantially the length of said horizontal platform along said front edge thereof, said clamping mechanism comprising a pair of horizontally oriented clamps affixed to said main frame and positioned to clamp said at least one workpiece against said fence and a second pair of vertically orient clamps to clamp said at least one workpiece against said horizontal platform.

3. The router machine claimed in claim 1 wherein said workpiece feed mechanism comprises a body affixed to said main frame adjacent said front edge of said horizontal platform, said body supporting an idler wheel beneath said at least one workpiece, a motor driven drive wheel being mounted on a hinge member affixed to said main frame, said drive wheel being aligned with and overlying said idler wheel, said drive wheel being shiftable between an upper disengaged position and a lower engaged position with said at least one workpiece pinched between said drive wheel and said idler wheel to advance and locate said at least one workpiece at said predetermined positions thereof.

4. The router machine claimed in claim 1 wherein said support assembly for said router assembly comprises a vertically oriented panel-like idler link having first and second ends provided with fixed vertical shafts, said shaft of said first end of said idler link being pivotally mounted in pillow blocks on said main frame, a vertically oriented router mounting arm having first and second ends, said shaft of said second end of said idler link being pivotally mounted in pillow blocks adjacent said first end of said router mounting arm, said second end of said router mounting arm having at least one vertical mounting plate thereon, said at least one router comprising a motor, a gear box for said motor and a router head with a router bit operatively connected to said gear box, a plate supporting said at least one router, said router plate and said router mounting arm plate being slidably interengaged by ways and an actuating mechanism controlled by output signals from said programmable electronic control system to shift said at least one router and router plate between said extended cutting position and said retracted non-cutting position.

5. The router machine claimed in claim 1 wherein each linear actuator assembly comprises a linear actuator, a drive motor, a gear box and a position encoder for said linear actuator.

6. The router machine claimed in claim 1 including a workpiece position encoder in association with said workpiece feed mechanism and position encoders in association with said linear actuator assemblies, said electronic control system comprising a computer numeric controller and a programmable logic controller, said computer numerical controller having output signals controlling said clamping mechanisms, said workpiece feed mechanisms, said linear actuator assemblies, and said at least one router and its vertical position, said computer numeric controller having inputs for feedback from said workpiece position encoder and said position encoders of said linear actuator assemblies, said electronic control system also including an operator interface.

7. The router machine claimed in claim 1 wherein said horizontally oriented clamps and said vertically orient clamps are each actuated by a fluid operated cylinder.

8. The router machine claimed in claim 1 including a workpiece position encoder and a rotatable encoder wheel mounted on a lever, said lever being pivotally affixed to said body, spring means biasing said encoder wheel into contact with said at least one workpiece.

9. The router machine claimed in claim 1 wherein said router assembly comprises two routers having opposed vertically oriented coaxial bits, said routers being mounted on said movable support assembly and being shiftable on said support assembly toward each other to their extended cutting positions and away from each other to their retracted non-cutting positions.

10. The router machine claimed in claim 4 wherein said actuating mechanism to shift said at least router and router plate between said extended cutting position and said retracted non-cutting position comprises a fluid actuated cylinder affixed to said arm mounting plate, and a piston in said cylinder having a piston rod operatively attached to said router plate.

11. The router machine claimed in claim 9 including two workpieces in stacked condition whereby both workpieces having router cuts simultaneously made therein by said routers.

12. A router machine for making repetitive router cuts at predetermined positions on two stacked workpieces, said router machine comprising a free standing main frame having an open work horizontal platform for supporting said workpieces, said horizontal platform having a longitudinal front edge, a vertical fence located along said longitudinal fence, horizontal and vertical fluid actuated clamping mechanisms for clamping said stacked workpieces against said fence and against said horizontal platform at said predetermined positions, a workpiece feed mechanism for advancing said workpieces to each of said predetermine positions, two spaced routers with opposed, vertically oriented, coaxial bits, a movable support assembly for said routers, said routers being shiftable vertically on said support assembly toward each other to an extended cutting position and away from each other to a retracted non-cutting position, a pair of linear actuator assemblies each having a first end pivotally attached to said frame and a second end pivotally engaged with an upstanding pivot pin affixed to said router support assembly to shift said routers through said repetitive router cuts, said pivot pin being coaxial with said router bits, a programmable electronic control system having output signals controlling said workpiece clamp mechanism cylinders, said workpiece feed mechanism, said routers, said vertical position of said routers between said extended cutting position and said retracted non-cutting position, and said linear actuator assemblies.

13. The router machine claimed in claim 12 wherein said workpiece feed mechanism comprises a body affixed to said main frame adjacent said front edge of said horizontal platform, said body supporting an idler wheel beneath said workpieces, a motor driven drive wheel being mounted on a hinge member affixed to said main frame, said drive wheel being aligned with and overlying said idler wheel, said drive wheel being shiftable between an upper disengaged position and a lower engaged position with said workpieces pinched between said drive wheel and said idler wheel to advance and locate said workpieces at said predetermined positions thereof.

14. The router machine claimed in claim 13 wherein said support assembly for said router assembly comprises a vertically oriented panel-like idler link having first and second ends provided with fixed vertical shafts, said shaft of said first end of said idler link being pivotally mounted in pillow blocks on said main frame, a vertically oriented router mounting arm having first and second ends, said shaft of said second end of said idler link being pivotally mounted in pillow blocks adjacent said first end of said router mounting arm, said second end of said router mounting arm having a vertical mounting plate thereon for each router, each of said routers comprising a motor, a gear box for said motor and a router head with a router bit operatively connected to said gear box, a support plate for each router, each router support plate and its respective router mounting arm plate being slidably interengaged by ways, and a fluid cylinder actuating mechanism controlled by output signals from said programmable electronic control system for shifting each router between said extended cutting position and said retracted non-cutting position.

15. The router machine claimed in claim 14 wherein each linear actuator assembly comprises a linear actuator, a drive motor, a gear box and a position encoder for said linear actuator.

16. The router machine claimed in claim 15 including a workpiece position encoder and a rotatable encoder wheel mounted on a lever, said lever being pivotally affixed to said body, spring means biasing said encoder wheel into contact with said workpieces.

17. The router machine claimed in claim 16 wherein said electronic control system comprising a computer numeric controller and a programmable logic controller, said computer numeric controller having output signals controlling said clamping mechanism cylinders, said workpiece feed mechanism, said router motors, said router vertical positioning cylinders, and said linear actuator motors, said computer numeric controller having inputs for feedback from said workpiece position encoder and said position encoders of said linear actuator assemblies, said electronic control system also including an operator interface.

18. The router machine claimed in claim 12 wherein said workpieces comprise a pair of stair stringers.

19. The router machine claimed in claim 17 wherein said workpieces comprise a pair of stair stringers.

20. A pair of identical stair stringers having formed therein corresponding mirror image sets of tread and riser grooves, a plurality of treads and risers equal in number respectively to the number of tread and riser grooves in each stringer, each tread groove in said risers being wider than the thickness of said treads with a first rectalinear upper edge which is horizontal and a second lower edge which slopes downwardly and rearwardly when its respective stringer is installed in place, each riser groove in said stringers being wider than the thickness of said risers with a first rectalinear forward edge which is vertical and a second rearward edge which slopes downwardly and rearwardly when its respective stringer is installed in place, said tread and riser grooves having base portions parallel to the outside surfaces of their respective stringer and said side walls of said tread and riser grooves sloping toward each other forming angles of about 4° with their respective bases, a tread wedge for each tread groove and a riser wedge for each riser groove, said tread and riser wedges having a base, side walls, a forward end and a rearward end, said side walls tapering longitudinally toward each other from said rearward end to said forward end, said side walls tapering transversely toward each other forming angles of about 2° with said base, each tread being located in its respective tread groove of each stringer and being forced against said first edges of said tread grooves by tread wedges located in each tread groove between said tread and said second edges of said tread grooves, each riser being located in its respective riser groove of each stringer and being forced against said first edges of said tread grooves by riser wedges located in said each riser groove between said riser and said second edges of said riser grooves, each riser abuting its respective tread, the forward ends of said tread wedges abuting said riser and said forward ends of said riser wedges abuting said tread wedges, said tread wedges and said riser wedges being tilted within their respective tread and riser grooves with said second tread and riser groove edges parallel to and abutting said adjacent side wall of their respective tread and riser wedges, said treads and risers being additionally affixed within their respective tread and riser grooves by at least one of fasteners and glue.

* * * * *

UNITED STATES PATENT AND TRADEMARK OFFICE
CERTIFICATE OF CORRECTION

PATENT NO. : 5,592,793
DATED : January 14, 1997
INVENTOR(S) : Harold E. Damratowski & Richard J. Merrick It is certified that error appears in the above-indentified patent and that said Letters Patent is hereby corrected as shown below:

Column 13, line 19 (claim 17), "comprising" should read --comprises--.
Column 14, line 25 (claim 20), delete "each".

Signed and Sealed this

Twelfth Day of August, 1997

Attest:

BRUCE LEHMAN

Attesting Officer     Commissioner of Patents and Trademarks